Sept. 11, 1956 C. R. HARRIS Re. 24,212

CONTROL FOR THE OPERATION OF ROVING FRAMES

Original Filed Nov. 22, 1950

INVENTOR.

BY Charles R. Harris

Herman Pid

Atty.

United States Patent Office

Re. 24,212
Reissued Sept. 11, 1956

24,212

CONTROL FOR THE OPERATION OF ROVING FRAMES

Charles R. Harris, Charlotte, N. C., assignor to Pneumafil Corporation, Charlotte, N. C., a corporation of Delaware Original No. 2,704,430, dated March 22, 1955, Serial No. 197,108, November 22, 1950. Application for reissue June 14, 1955, Serial No. 515,569

14 Claims. (Cl. 57—81)

Matter enclosed in heavy brackets [ ] appears in the original patent but forms no part of this reissue specification; matter printed in italics indicates the additions made by reissue.

This invention relates to roving frames employed in textile mills and, more particularly, to methods of and means for stopping operations when a [sliver] *roving* is broken, and safely resuming operations after the broken [sliver] *roving* has been pieced up.

Various methods have heretofore been proposed for stopping the operation of a roving frame when a [sliver] *roving* breaks but these have been impractical or faulty in operation because speedy stopping of the machine was dependent upon pressure responsive mechanism incapable of responding, substantially instantaneously as required, to the slight or small change in pressure conditions brought about by the broken [sliver] *roving*. In addition, resumption of operations subsequent to piecing up caused renewed application of suction and this often produced sudden tension which resulted in additional [sliver] *roving* breakage or undesirable strain upon the repaired [sliver] *roving*.

A principal object of the invention is to provide a method of operation wherein the roving frame is promptly stopped upon the breakage of a [sliver] *roving* before the broken end tangles with adjacent [slivers] *rovings*, and the frame started subsequent to piecing up under conditions assuring satisfactory resumption of the winding operation.

A feature of the invention consists in providing a sensitive detecting mechanism, whose sensitivity may be controlled as desired, to actuate a control governing the driving mechanism to stop the same substantially instantaneously whenever a [sliver] *roving* on a roving frame becomes broken. *It will be understood the frame may be permitted to "coast" to a stop.*

Another feature of the invention consists in providing a suction tube *or flute orifice* positioned proximate the course of travel of a [sliver] *roving* frame, said tube being arranged to suck into its [mouth] *orifice* the broken end of a [sliver] *roving*, and a passageway connected to the tube having therein a sensitive detecting device so that the entrance of the broken end of a [sliver] *roving* from the tube into the passageway *and its passage through the passageway* will cause said device to actuate a control for stopping the operation of the roving frame.

Another feature of the invention resides in providing a suction tube *or flute orifice* adjacent the course of travel of a [sliver] *roving* on a roving frame, a passageway connecting to the tube, a sensitive device within the passageway operated responsive to the entrance of a broken [sliver] *roving* into the passageway, a mechanism actuated by the device to stop the operation of the roving frame, and a control for timing the resumption of suction effect on said tube after operation of the roving frame is resumed.

Another object of the invention is to provide a simple, compact, and relatively inexpensive combination of apparatus designed to be associated with and installed on a roving frame, so that no redesign in the frame is required, and yet a positive regulation *is* afforded to stop the operation of the roving frame upon breakage of any [sliver] *roving* fed to a flyer.

Another feature consists in providing a compact system of control adapted to be assembled at a point of fabrication and then simply and inexpensively installed on a roving frame in a mill remote from the point of assembly.

Other features making for simplicity in design, sensitivity in detection of broken [slivers] *rovings*, and reliability in operation to avoid loss of time or material and assure maximum production with optimum regard for quality, will be more apparent from the following description of a typical form of the invention to be read together with the accompanying illustrative drawings in which.

Figure 1:
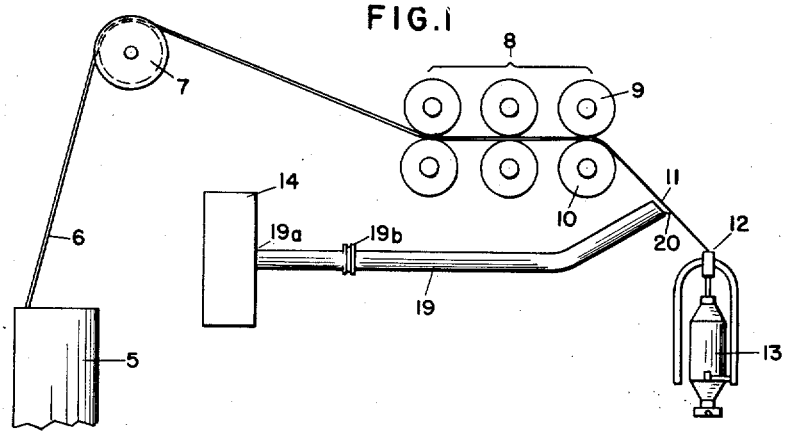
Fig. 1 is a diagrammatical arrangement of a section through a roving frame equipped with one form of the invention.

Considering the drawings, similar designations referring to similar parts, numeral 5 designates a sliver can from which sliver 6 is slowly fed, in the manner well known to those skilled in the art, to the usual lifting roll 7, and then proceeds in a course through drafting area 8. In Fig. 1, upper and lower drafting rolls, designated 9 and 10 respectively, are shown and the sliver emerges as roving 11, then proceeding through flyer 12 to collecting bobbin 13. The foregoing describes the normal course of a sliver on a roving frame and the production of the final product of roving.

The normal roving frame feeds a great number of slivers, on the order of [96 to 160] *72 to 180*, depending upon the type and size frame employed. When a roving end breaks, it is not unusual for the broken end to be whipped about and soon become entangled with adjacent roving ends to break them and produce a mass of twisted and useless material, causing considerable loss if not promptly detected by an operator. Since it is not uncommon for several roving frames to be tended by one operator, it is often impossible to stop a frame, after such breakage and entanglement begins, until the loss is considerable. The operator, upon stopping the frame, must then not only remove the spoiled material but is confronted with the job of piecing up a great number of broken ends.

Applicant avoids this waste of time and material by providing a simple and effective mechanism for "watching" each roving end and promptly stopping the frame should an end become broken.

Figure 2:
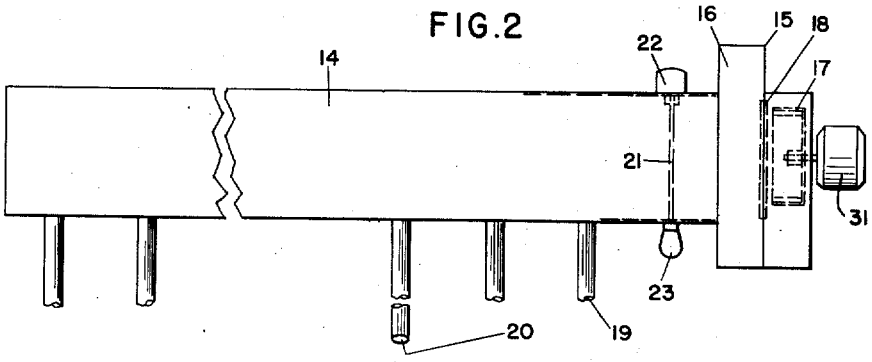
Fig. 2 is a diagrammatical arrangement, in plan view of applicant's mechanism, more particularly designed to show the location of the sensitive detection device.

As diagrammatically illustrated in Figs. 1 and 2, a collecting header or duct 14 is provided which runs lengthwise of the frame. This may be of sheet metal, of any desirable construction, and may be attached to the rear of the frame, as for example to the shipper rod castings. The intake end of duct 14 connects to a fan casing 15 preferably divided into collecting chamber 16 separated from fan chamber 17 by a lint separating screen 18. A fan, not shown, preferably of the impeller type is suitably housed in chamber 17. Suction tubes 19 are suitably connected to header 14 and are spaced along the length of the header so that each roving end is served by an individual tube *or flute orifice* whose open or suction end 20 is located beneath and spaced approximately 2" from the course of travel of the roving end served thereby. It should be understood that depending upon the size of the tube, the suction, and size of roving, it may be desirable to space end 20 closer to or farther away from the course of travel of roving 11, and the 2" space mentioned is illustrative of one arrangement successfully used by applicant, to which he is not limited.

The suction tubes 19 connect with header 14 at points *19a* [19A] which may be at or any desired distance above the bottom of the header. The suction tubes preferably are supported by and rest directly upon the roller beams except that the opposite end of each tube is preferably inclined or curved upwardly toward the path of travel of roving 11. For example, the tube may be swivelled at point *19b* [19B] so that suction end 20 may be adjusted as desired to point directly at its companion strand of roving.

Positioned within header 14 between the first suction tube closest to collecting chamber 16 and the chamber itself is installed a detecting and control device such as type RR11 register regulator of the Westinghouse Electric Corporation.

In practice, a beam of light 21, of desired intensity, from a light source 22 acts upon photoelectric tube 23. Under normal conditions, the intensity of light acting upon tube 23 will remain substantially constant. However, assuming a broken end of roving crosses the beam of light, then a change in intensity will occur whereupon tube 23 will instantaneously react to bring about a stopping of the frame, as will subsequently be described in detail.

The fan employed in chamber 17 is of such design and is driven at such speed that a pressure is produced sufficient to create required suction throughout the length of header 14 so that a broken end of roving 11 will readily be sucked within suction end 20 of its companion tube 19. Thus, it will not be whipped around and cause damage. The end will rapidly enter header 14, and proceed to chamber 16 passing through light beam 21. The variation in light intensity resulting from the passage of the broken end through the light beam will actuate tube 23 to cause the *driving mechanism of the machine* (machine) to be stopped. All this occurs substantially instantaneously. *The frame may "coast" to a stop.* The operator will promptly note the signal, hereinafter explained, which is flashed when the machine stops and repair the break. Then he will start the machine by a shift of the shipper rod in the usual manner whereupon the driving motor for the roving frame will commence to run. [However,] *It will be understood that the suction in header 14 and tubes 19 need not be discontinued when the roving frame is stopped. Preferably, the suction is discontinued, however, so that* suction in header 14 and tubes 19 will not take place upon the restarting of the frame. It is [highly] undesirable to have any suction produced before the repaired roving has had a chance to become tightly wound about the bobbin and unimpaired roving, in taut condition, brought forward. Accordingly, after the machine has resumed normal operation for a short, predetermined period, when suction can no longer pull upon slack roving, applicant provides for restoration of suction in the tubes 20 and duct 14. This is accomplished by a suitable time delay control which serves to put the fan in operation a predetermined period subsequent to resumption of the operation of the frame itself.

Figure 3:
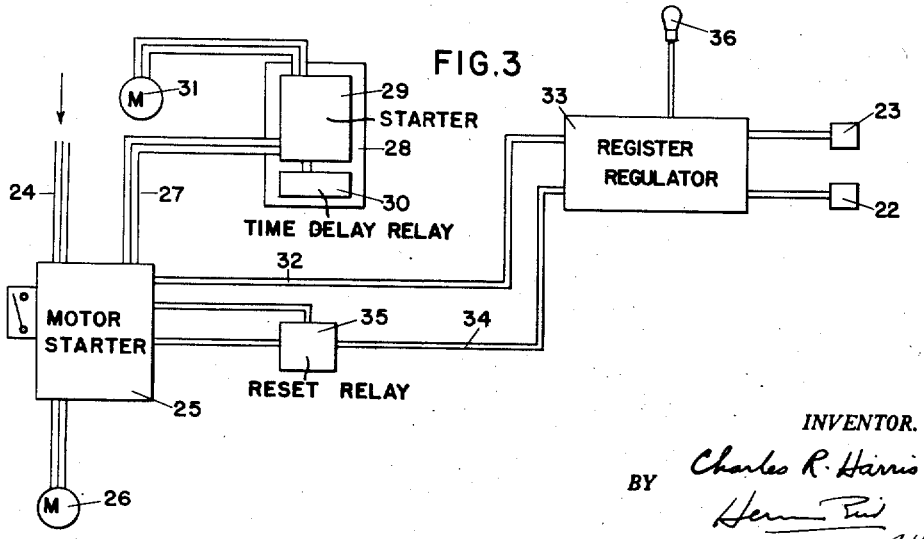
Fig. 3 is a wiring *diagram* [diagrammatic] showing the interconnection of controls employed to carry out the invention.

The control arrangement employed to produce the desired sequence of operations is diagrammatically shown in Fig. 3. A suitable source of current, usually on the order of 3 phase, 550 volts, is indicated by leads 24, serving motor starter 25 serving motor 26 of the roving frame. It will be understood that a control switch and any desired side equipment will be furnished and installed in the usual manner. Leads 27 feed control arrangement 28 consisting of starter 29 and time delay relay 30. This relay is of the type exemplified by model AM time delay relay of Westinghouse Electric Corporation.

In practice, time delay relay 30 will cause a lag of a predetermined period, for example 10 seconds after motor 26 has started, before starter 29 is actuated to control motor 31 operating the fan in chamber 17.

Leads 32 serve register regulator 33 which governs light source 22 and photoelectric tube 23 before described.

Leads 34 connected to reset relay 35 serve to restore normal functioning of register regulator 33 after interruption of service. Signal light 36 is arranged to flash when the register regulator is actuated, upon an interruption in service, and the light circuit is broken by the register regulator when it is restored to normal condition; except that reset relay 35 will serve to maintain the light in flashing condition until the roving frame shipper rod handle is actuated to close the circuit for roving frame motor 26.

In practice, the control arrangement shown in Fig. 3 may, with the exception of signal light 36, be mounted and arranged compactly in combination with a single panel at one end of the frame.

When a strand of roving breaks, the passage of the broken end into the duct 14 and through light beam 21 will cause a variation in intensity which actuates regulator 33 to break the circuit serving motor 26. This is the first step. Then, after the operator has repaired the break and shifted the shipper rod to start motor 26, by which time register regulator has restored itself, the time delay relay 30 keeps fan motor 31 from functioning for a predetermined period. This is step No. 2. When the time delay relay, after the desired interval, permits starter 29 to function so that the fan motor starts and pulls a suction of duct 14 and tubes 20, step 3 takes place to assure safe resumption of operation. This three step mode of operation has never before been employed to assure prompt cessation of operations, with minimum loss of time and material, and safe resumption after repair.

The employment of register regulator 33 affords a wide range of sensitivity so that a slight light change or variation in light intensity responsve to the rapid passage of so flimsy a material as a disintegrating speck of fiber will be sufficient to produce the instantaneous action required to stop the frame. Previous attempts to solve the problem which required relatively large differences in pressure or the accumulation of masses of material for positive actuation of stopping mechanism are impractical since they lacked both sensitivity and prompt relief to avoid damaging losses. Applicant's ability to adjust the regulator enables extremely accurate control so that a small and slender roving end slight in body, weight or mass, will still bring about instantaneous response.

Since the drawings are intended to illustrate a typical assembly of elements to accomplish applicant's improved result, it will be obvious that various modifications in manner of application upon the frame, in positioning of parts, and in provision of controls, will suggest themselves to those skilled in the art, and applicant therefore does not limit himself to the specific arrangement disclosed except as specified in the appended claims.

I claim:

1. A method of controlling the operation of a roving frame which comprises applying suction force adjacent the path of travel of the rovings, said suction force being sufficient to cause entrapment and travel of a broken strand of roving to a field of detection at a distance from the point of application of said suction force, said field of detection being responsive to said broken strand to stop operation of the roving frame and immediately thereafter stop application of the suction force, thereafter causing the frame to be restarted after repair of the broken strand while preventing application of said suction force for a predetermined interval of time after operation of the frame has been restarted, and re-applying said suction force at the termination of said predetermined interval of time.

2. A method of operating a roving frame which comprises applying suction force at a point adjacent the path of travel of a strand of roving, said force being sufficient to draw the end of the strand, in the event of breakage thereof, into a confined zone and to convey it through an electrical field of detection at a point remote from the point of application of said suction force, said field of detection being responsive to the passage of said broken strand therethrough to stop the operation of the roving frame and the application of said suction force, restarting the roving frame after the broken strand is repaired, while preventing application of said suction force for a predetermined interval of time after said operation of the frame has been restarted, and re-applying said suction force at the termination of said predetermined interval of time.

3. A method of operating a roving frame which comprises applying a suction force at a point adjacent the path of travel of a strand of roving, said force being sufficient to draw the end of the strand, in the event of breakage thereof, into a confined zone and away from other, unbroken, strands, and to convey it through a field of detection remote from the point of application of said suction force and operative to cause the frame and the application of said suction force to be stopped substantially immediately after the broken strand passes into said field of detection.

4. A method according to claim 3 in which operation of the frame is resumed subsequent to repair of the broken strand and in which application of said suction force is reestablished after lapse of a predetermined interval of time subsequent to such resumption of operation of the frame.

5. A method of controlling the operation of a roving frame consisting in applying suction in a predetermined air channel, connecting said air channel to a plurality of points of collection adjacent paths of travel of strands of roving, providing a light beam at one end of the channel, causing the frame to stop upon a substantially instantaneous variation in intensity of a portion of said light beam, and causing the frame to resume operation whereupon mechanim actuated by the light beam will remain inoperative until said light beam is again affected.

6. A method according to claim 5 in which air movement in said channel ceases upon the stopping of said frame and is resumed subsequent to the resumption of operation of the frame.

7. In combination with a roving frame, a collecting header, means for producing a suction in said header, suction tubes connected to said header, each suction tube having an open end positioned adjacent the line of travel of a strand of roving fed to a flyer, means for providing a light beam in the header, means for stopping the operation of the frame upon the passage of a broken strand of roving through the light beam, means for restoring operation of the frame subsequent to repair of the broken strand, and means for controlling the production of said suction in the header so that suction will be restored in the header after the elapse of an interval of time subsequent to restoration of operation of the frame.

8. A system of control for a roving frame of the character described including means for actuating a frame motor for driving the frame, a starter and a time delay device for actuating a fan motor subsequent to the actuation of the frame motor, a register regulator for breaking the circuits controlling both said motors, whereupon said register regulator is restored to pre-operative condition, and means for causing said register regulator to operate upon a change in intensity of a beam of light.

9. A system of control for a roving frame of the character described including a motor starter in combination with a frame motor, a time delay relay governing a starter for a fan motor, a register regulator operative responsive to the action of a photoelectric tube governed by changes in intensity of a light beam, a control for a signal operative upon breaking a circuit serving the frame motor, and means for operating both motors in a series of steps separated by a desired time interval and for controlling said motors simultaneously upon the operation of the register regulator.

10. In combination with a roving frame, a suction duct, means for producing a suction in said duct, suction tubes connected to said duct, each suction tube having its open end positioned adjacent the line of travel of a strand of roving fed to a flyer, an electrical detecting device in the suction duct, means operative in response to the passage of a broken strand of roving in a line of travel past said device for stopping the operation of the frame, means for restoring operation of the frame subsequent to repair of the broken strand, and means for re-establishing production of suction in said duct, said last-named means being controlled to re-establish the production of said suction after the elapse of a desired interval of time subsequent to restoration of operation of the frame.

11. A method of controlling the operation of a roving frame which, comprises feeding strands of rovings in paths lying substantially in a common plane, entrapping any broken strand by exerting suction force thereon adjacent its normal path of travel, and conveying said broken strand under said suction force into and through an electrical field of detection within the zone of said suction force at a point remote from said path of travel of unbroken strands to cause operation of the frame and of said suction force to be interrupted in response to the passage of said broken strand through said field substantially immediately after said strand enters said field.

12. In combination with a roving frame, a main collecting duct, means for producing a suction in said main collecting duct, a plurality of suction tubes connected to said main collecting duct, each suction tube having an open end positioned adjacent the line of travel of a strand of roving, means for producing an electrical field of detection in the main collecting duct, means for stopping the production of suction in all said ducts and for stopping the operation of the frame upon the passage of a broken strand of roving through said field of detection, and means for restoring the operation of the frame and the production of suction in all said ducts after the broken strand is repaired.

*13. In combination with a roving frame, a suction duct, means for producing a suction in said duct, suction tubes connected to said duct, each suction tube having its open end positioned adjacent the line of travel of a strand of roving, an electrical detecting device in the suction duct, means operative in response to the passage of a broken strand of roving in a line of travel past said device for stopping the operation of the frame, and means for restoring operation of the frame subsequent to repair of the broken strand.*

*14. A method of controlling the operation of a roving frame consisting in applying suction in a predetermined air channel, connecting said air channel to a plurality of points of collection adjacent paths of travel of strands of roving, providing an electrical field of detection in the channel, causing the frame to stop upon the presence of a yarn strand in said field of detection, and causing the frame to resume operation whereupon mechanism actuated by the field of detection will remain inoperative until said field of detection is again affected.*

References Cited in the file of this patent or the original patent

UNITED STATES PATENTS

| | | |
|---|---|---|
| 2,077,525 | Mennesson | Apr. 20, 1937 |
| 2,271,178 | Blom | Jan. 27, 1942 |
| 2,438,365 | Hepp | Mar. 23, 1948 |
| 2,464,468 | Thomas | Mar. 15, 1949 |
| 2,500,343 | Carrette | Mar. 14, 1950 |
| 2,511,928 | Mansfield | June 20, 1950 |